(12) United States Patent
Lifshitz et al.

(10) Patent No.: US 7,050,458 B1
(45) Date of Patent: May 23, 2006

(54) EFFICIENT FRAMING FOR ADSL TRANSCEIVERS

(75) Inventors: Israel Lifshitz, Jerusalem (IL); Liron Frenkel, Netanya (IL); Moran Amidan, Ganei Yehuda (IL)

(73) Assignee: Tioga Technologies Ltd., San Jose, CA (US)

( * ) Notice: Subject to any disclaimer, the term of this patent is extended or adjusted under 35 U.S.C. 154(b) by 967 days.

(21) Appl. No.: 09/699,214

(22) Filed: Oct. 27, 2000

Related U.S. Application Data

(60) Provisional application No. 60/166,654, filed on Nov. 18, 1999.

(30) Foreign Application Priority Data

Oct. 28, 1999 (IL) .................................. 132638

(51) Int. Cl.
*H04J 3/16* (2006.01)

(52) U.S. Cl. .................. 370/468; 370/352; 370/465
(58) Field of Classification Search ................ 370/352, 370/353, 354, 356, 389, 392, 395.52, 437, 370/465, 468, 493, 494, 495
See application file for complete search history.

(56) References Cited

U.S. PATENT DOCUMENTS

| 5,995,567 | A | 11/1999 | Cioffi et al. |
| 6,167,095 | A | 12/2000 | Furukawa et al. |
| 6,275,098 | B1 | 8/2001 | Uehara et al. |
| 6,324,212 | B1 | 11/2001 | Jenness |
| 6,337,877 | B1 | 1/2002 | Cole et al. |
| 6,501,791 | B1 * | 12/2002 | Hwang ................. 375/222 |
| 6,536,001 | B1 * | 3/2003 | Cai et al. ................ 714/701 |

OTHER PUBLICATIONS

ITU Telecommunication Standardization Sector, Study Group 15, Temp. Doc. MA-027, Australia, Mar. 29-Apr. 2, 1999, "G.gen.bis: Seamless Rate Adaptation (SRA): a fast, robust, efficient protocol for on-line rate adaptation and power management", pp. 1-4.

ITU Telecommunication Standardization Sector, Jul. 1999, G.992.1 Final Version, "Draft New Recommendation G.992. 1: Asymmetrical Digital Subscriber Line (ADSL) Transceivers—Approved", pp. 1-264.

ITU Telecommunication Standardization Sector, Study Group 15, Temp. Doc. NT-037, Tennessee, Nov. 1-5, 1999, "G.gen: Seamless Rate Adaptation (SRA) and VoDSL", pp. 1-6.

(Continued)

*Primary Examiner*—Phirin Sam
(74) *Attorney, Agent, or Firm*—Darby & Darby

(57) ABSTRACT

A method for transmitting data includes arranging a predetermined quantity of the data together with one or more overhead bytes in an overhead frame and dividing the overhead frame into equal segments, each of the segments including a number of bits that is not an integer multiple of eight. Each of the segments is encoded as a symbol for transmission over a communication channel.

47 Claims, 1 Drawing Sheet

OTHER PUBLICATIONS

ITU Telecommunication Standardization Sector, Study Group 15, Temp. Doc. FI-072, Fiji Island, Jan. 31-Feb. 4, 2000, "Gen.g: G.lite.bis and G.dmt.bis System Design Enabling Seamless Rate Adaptation", pp. 1-9.

Committee T1—Telecommunications, T1E1/99-004, Costa Mesa, Mar. 12, 1999, "Draft Minutes" Dec. 4, 1998, T1E1 Plenary, Plano, TX, pp. 1-21.

ITU Telecommunication Standardization Sector, Study Group 15, Temp. Doc. NT-103, Tennessee, Nov. 1-5, 1999, "G.lite.bis: Efficient framing for G.lite.bis modems", pp. 1-3.

ITU Telecommunication Standardization Sector, Study Group 15, Temp. Doc. NT-081, Tennessee, Nov. 1-5, 1999, "G.gen: Analysis of efficient framing proposal", pp. 1-2.

* cited by examiner

EFFICIENT FRAMING FOR ADSL TRANSCEIVERS

CROSS-REFERENCE TO RELATED APPLICATIONS

This patent application claims the priority of U.S. provisional patent application No. 60/166,654, filed Nov. 18, 1999, which is incorporated herein by reference.

FIELD OF THE INVENTION

The present invention relates generally to digital transmission systems, and specifically to framing and encoding of data for digital transmission.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. A range of DSL standards have been defined, known generically as "xDSL," wherein the various standards have different data rates and other associated features but share common principles of operation.

The present patent application is concerned mainly with Asymmetric DSL (ADSL) service, which allows data to be conveyed downstream from a central office to subscribers at a rate up to about 8 Mbit/s, and to transport an upstream signal from the subscribers at a rate of about 640 kbit/s. ADSL is rate-adaptive, and the actual rate of data transmission over each subscriber line is determined according to noise conditions and the length of the line. Consequently, subscribers located far from the central office may be limited to low bit rates, and some distant subscribers cannot be offered even minimal service. There is therefore a need to improve the performance of ADSL modems at low rates and high reaches, in order to increase the coverage that can be offered by a given central office.

ADSL is based on a discrete multi-tone (DMT) transmission system, in which data are encoded using 256 different "tones," each corresponding to a frequency band 4.3125 kHz wide. Each DMT symbol is a mapping of a fixed number of bits to sine waves of multiple frequencies. The number of bits per symbol is determined according to the line quality, and is typically low for long and noisy lines.

Prior to data encoding in a DMT modem for ADSL transmission, the input data are assembled into groups, or frames. Conventional ADSL framing is defined in Recommendation G.992.1 (ex G.dmt) of the International Telecommunication Union (ITU), which is incorporated herein by reference. A predetermined number (S) of framing bytes (8 bits each) is added to each frame of payload data. A Reed-Solomon encoder adds P parity bytes (also known as check bytes, error correction bytes or redundancy bytes) to each frame, P an integer multiple of S, in order to produce a Reed-Solomon codeword, or output frame, of N bytes. In the context of the present patent application and in the claims, the framing bytes and parity bytes are collectively referred to as "overhead bytes." The codeword is then divided into Q equal parts of B bytes each. Each such part is mapped to a DMT symbol.

For long lines, B is small, and therefore the percentage of the overhead is large. The high overhead stems from the fixed amount of overhead per symbol that is required by the ADSL standard. There is typically one framing byte per symbol (i.e., the number of framing bytes S is equal to the number of symbols Q), and at least one parity byte. When there are relatively few bytes per symbol, much or most of the available bandwidth may be taken up by the overhead. This substantial constant overhead engendered by ADSL standards limits the possibility of providing ADSL service over long lines.

Methods have been proposed for improving ADSL framing by reduction of the number of overhead bytes per codeword. For example, ITU temporary document MA-027, which is incorporated herein by reference, proposes a protocol for on-line rate adaptation using constant percentage overhead framing. This document was published on Mar. 29, 1999, after the date of conception of the present invention. According to the protocol proposed in MA-027, DMT frames (or symbols) are decoupled from input data frames and Reed-Solomon codewords, so that the DMT frames are not aligned with or the same size as the data frames and codewords. Thus, a DMT frame will not necessarily contain a fixed number of overhead bytes as in standard ADSL framing. The document presents one example in which each DMT frame includes 0.35 bytes of overhead (check bytes plus framing bytes).

SUMMARY OF THE INVENTION

It is an object of some aspects of the present invention to provide improved methods and apparatus for data framing and encoding, and particularly for framing and encoding data for transmission in the form of DMT symbols.

It is a further object of some aspects of the present invention to provide methods and apparatus that improve the efficiency of encoding used in ADSL transceivers, and consequently to reduce transmission overhead.

Methods of ADSL encoding known in the art require that each DMT symbol correspond to an integer number of bytes, B, of output data. The optimal number of bits per DMT symbol, however, is a function of the quality and length of the communication line, and is not necessarily a multiple of eight. Therefore, up to seven bits per symbol may be wasted by conventional encoding methods, which require that each symbol correspond to an integer number of bytes. This implied overhead is significant, and has been overlooked in the prior art. Preferred embodiments of the present invention reduce or eliminate this added overhead by allowing the use of substantially any desired number of bits per DMT symbol, and not only multiples of eight.

In preferred embodiments of the present invention, input data are assembled into an overhead frame, which preferably contains an integer number of bytes of data, along with one or more framing bytes and Reed-Solomon parity bytes (or redundancy bytes). The overhead frame is divided into a number of DMT symbols, Q, so as to give a fixed, integer number of bits, L, per symbol, wherein L need not be a multiple of eight. The choice of Q is substantially independent of S and P, and is preferably made so as to optimize L for the given line conditions. Neither the number of framing bytes, S, nor the number of parity bytes, P, need be a multiple of Q.

This added flexibility in the choice of parameters Q, L, S and P enables transmission overhead to be reduced substantially, in comparison with data transceivers known in the art, particularly when operating at low data rates. It thus allows better ADSL service to be offered over long and/or noisy subscriber lines. It also facilitates support of different, non-standard data rates without wasting line capacity on bit stuffing, as in framing methods known in the art.

There is therefore provided, in accordance with a preferred embodiment of the present invention, a method for transmitting data, including:

arranging a predetermined quantity of the data together with one or more overhead bytes in an overhead frame;

dividing the overhead frame into equal segments, each of the segments including a number of bits that is not an integer multiple of eight; and encoding each of the segments as a symbol for transmission over a communication channel.

Preferably, dividing the frame into equal segments includes dividing the frame into a number Q of segments, wherein the one or more overhead bytes include a number of overhead bytes that is not an integer multiple of Q. Most preferably, the number of overhead bytes is less than Q.

Further preferably, the overhead bytes include one or more framing bytes, wherein the one or more framing bytes include a number S of framing bytes in the overhead frame, and wherein dividing the frame into equal segments includes dividing the frame into a number Q of segments, wherein S is not an integer multiple of Q. Most preferably, S is less than Q.

Additionally or alternatively, the overhead bytes include one or more error correction bytes, wherein the one or more error correction bytes include a number P of check bytes in the overhead frame, and wherein dividing the frame into equal segments includes dividing the frame into a number Q of segments, wherein P is not an integer multiple of Q. Preferably, P is less than Q. Most preferably, arranging the data in the overhead frame includes generating a Reed-Solomon codeword, wherein the error correction bytes include parity bytes of the Reed-Solomon codeword.

In a preferred embodiment, encoding each of the segments as a symbol includes generating discrete multi-tone (DMT) symbols, wherein generating the DMT symbols includes generating the symbols for transmission over a digital subscriber line (DSL) connection.

Preferably, dividing the overhead frame into segments includes determining the number of bits to be included in each segment responsive to a characteristic of the communication channel.

In a preferred embodiment, encoding each of the segments includes generating symbols for transmission over a digital subscriber line (DSL) connection at a standard DSL symbol rate, and arranging the data in the overhead frame includes determining the quantity of the data and adding the overhead bytes thereto so that the data are transmitted over the communication channel at a transmission bit rate that is not a multiple of eight times the standard DSL symbol rate. Preferably, the standard DSL symbol rate includes an Asymmetric DSL (ADSL) rate of 4000 symbols/sec. Most preferably, generating the symbols includes assembling the data in the symbols substantially without bit-stuffing. Further preferably, encoding each of the segments includes synthesizing a symbol clock at which to transmit the symbols over the DSL connection, based on a reference clock at the transmission rate provided at a central communication office.

There is also provided, in accordance with a preferred embodiment of the present invention, a method for transmitting data, including:

arranging a predetermined quantity of the data together with a selected number of overhead bytes in an overhead frame;

dividing the overhead frame into a number of equal segments, such that the selected number of the overhead bytes is not an integer multiple of the number of segments; and encoding each of the segments as a symbol for transmission over a communication channel.

There is additionally provided, in accordance with a preferred embodiment of the present invention, a data transmitter, including:

a frame processor, adapted to arrange a predetermined quantity of the data together with one or more overhead bytes in an overhead frame; and an encoder, adapted to divide the overhead frame into equal segments, each of the segments including a number of bits that is not necessarily an integer multiple of eight, and to encode each of the segments as a symbol for transmission over a communication channel.

Preferably, the frame processor includes a framer, and the overhead bytes include one or more framing bytes introduced by the framer.

Additionally or alternatively, the frame processor includes an error correction encoder, and the overhead bytes include one or more error correction bytes generated by the Reed-Solomon encoder. Preferably, the error correction encoder includes a Reed-Solomon encoder, and the error correction bytes include parity bytes of a Reed-Solomon codeword.

There is further provided, in accordance with a preferred embodiment of the present invention, a data transmitter, including:

a frame processor, adapted to arrange a predetermined quantity of the data together with a selected number of overhead bytes in an overhead frame; and an encoder, adapted to divide the overhead frame into a number of equal segments, such that the selected number of the overhead bytes is not an integer multiple of the number of segments, and to encode each of the segments as a symbol for transmission over a communication channel.

The present invention will be more fully understood from the following detailed description of the preferred embodiments thereof, taken together with the drawings in which:

DETAILED DESCRIPTION OF PREFERRED EMBODIMENTS

Figure 1:
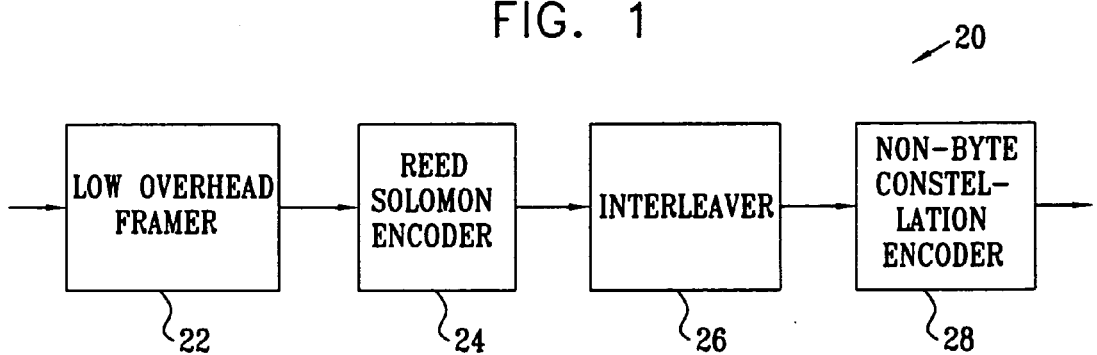
FIG. 1 is a block diagram that schematically illustrates a data transmitter, in accordance with a preferred embodiment of the present invention.

FIG. 1 is a block diagram that schematically illustrates an ADSL data transmitter 20, in accordance with a preferred embodiment of the present invention. Although transmitter 20 is suited particularly to meet the requirements of ADSL, it may also be adapted for use in communication systems of other types. All of the functional blocks of the transmitter that are shown in FIG. 1 can be implemented using hardware and/or software, as is known in the ADSL art. Other elements of the transmitter that are not essential to understanding of the present invention are omitted from the figures for the sake of simplicity.

A low-overhead framer 22 receives a stream of information payload bits. It assembles the bits into bytes, and adds framing bytes in predetermined locations. A Reed-Solomon encoder 24 adds parity (redundancy) bytes to the frame, and thus produces an overhead frame. In this implementation of the present invention, the overhead frame is also a Reed-Solomon codeword, in accordance with the ADSL standard. Alternatively, the present invention may also be applied in conjunction with other methods of error-correction coding, as are known in the art. The codeword is then processed by an interleaver 26, as defined by the ADSL standards. Framer 22, encoder 24 and interleaver 26 together are referred to hereinbelow as a frame processor.

A non-byte constellation encoder 28 divides the overhead frame into Q equal segments of L bits each, and encodes each byte as a DMT symbol. Q and L are optimized for the characteristics of the line over which transmitter 20 is operating. L may be substantially any integer, and is not necessarily divisible by eight, unlike systems known in the art. Furthermore, the number of framing bytes and parity bytes added by framer 22 and encoder 24 need not be integer multiples of the number of segments (or symbols) Q. Examples of the novel framing and encoding carried out by transmitter 20 are shown below.

Figure 2:
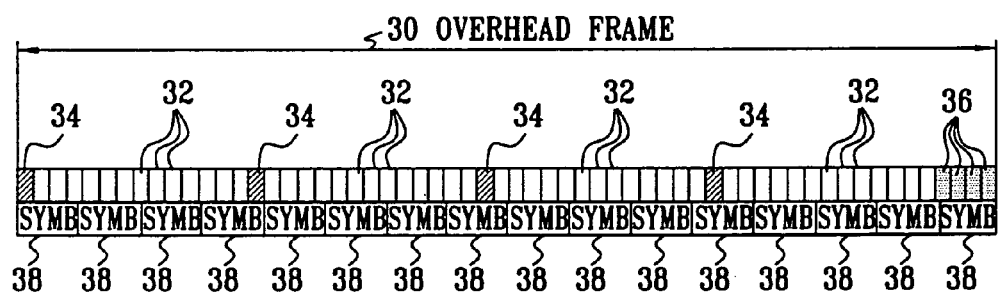
FIG. 2 is a block diagram that schematically represents an overhead frame, in accordance with a preferred embodiment of the present invention.

FIG. 2 is a block diagram that schematically illustrates an overhead frame 30 generated by transmitter 20, in accordance with a preferred embodiment of the present invention. The overhead frame, generated at the output of Reed-Solomon encoder 24, comprises payload bytes 32, framing bytes 34 and redundancy bytes 36. In all, frame 30 comprises fifty-two payload bytes 32, along with eight overhead bytes (four framing bytes and four redundancy bytes). For the sake of clarity, the operation of interleaver 26 is transparent in this example. In any case, the normal operation of the interleaver is straightforward, in accordance with ADSL standards, and does not affect the other elements of transmitter 20.

Constellation encoder 28 divides overhead frame 30 into sixteen segments 38, each of which is mapped to a corresponding DMT symbol. Thus, Q=16, and the number of bits per DMT symbol (L) is thirty (3.75 bytes=60 bytes/frame÷16 symbols). There is 0.5 overhead byte per symbol (0.25 framing and 0.25 redundancy). The value of L is set, as noted above, based on the length and noise conditions in the channel over which transmitter 20 is operating. In a conventional ADSL transmitter under these conditions, in which S and P must be integer multiples of Q, only twenty-four bits (three bytes) per symbol could be transmitted, and sixteen of those bits would be used by framing and redundancy bytes. This embodiment exemplifies the advantage of the present invention in terms of efficient use of channel bandwidth.

Figure 3:
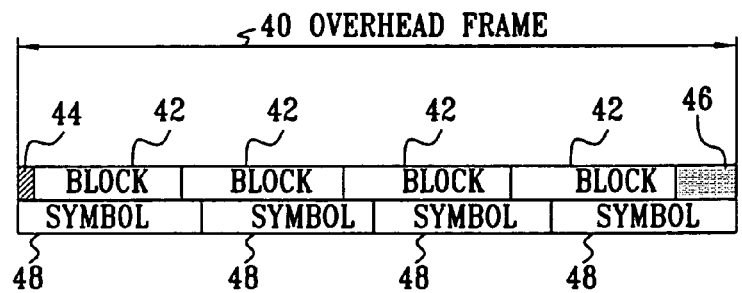
FIG. 3 is a block diagram that schematically represents an overhead frame, in accordance with another preferred embodiment of the present invention.

FIG. 3 is a block diagram that schematically illustrates an overhead frame 40, generated by transmitter 20 in accordance with another preferred embodiment of the present invention. In this embodiment, aspects of the present invention are used to support a data rate of 1544 kHz, which is standard for DS1 service, which is used in North America for multiplexing telephone voice channels. ADSL transmitters operate at 4000 symbols/sec, so that in conventional operation, they transmit data only at rates that are multiples of 32 kbps (due to the constraint that there must be an integer number of bytes/symbol, as mentioned above). The 1544 kHz DS1 rate is not a multiple of this ADSL standard rate. Therefore, a stuff-rob mechanism, as is known in the art, would ordinarily have to be used to accommodate the DS1 data. This mechanism "stuffs" null data bytes into the data stream as required, so as to adjust the input data rate to be a multiple of 32 kbps. As a result, a portion of the channel capacity is wasted on stuff bytes.

The embodiment of FIG. 3 overcomes this limitation. Overhead frame 40 comprises a single overhead byte 44, sixteen redundancy bytes 46, and four payload blocks 42 of 386 bits each. Frame 40 is divided by constellation encoder 28 into four segments 48 (Q=4), with L=420 bits (52.5 bytes) per DMT symbol. Preferably, an ADSL clock for transmitter 20 is synthesized based on a reference clock that is available at the telephone network central office and is synchronized to the DS1 stream. Payload blocks 42 can then be transferred over ADSL at the standard rate of 4000 symbols/sec. The resultant data rate (4000 symbols/sec×386 payload bits/symbol) exactly matches the DS1 rate of 1544 kHz.

The values of L and Q and the numbers of overhead bytes used in each of the above embodiments are chosen for convenience in the specific application examples that are described. The present invention is not limited, however, to these particular choices of parameters. A key advantage of the present invention is that the framing and encoding parameters can be chosen and changed flexibly to meet the needs of different line conditions and different applications.

Although preferred embodiments are described hereinabove with specific reference to ADSL systems and DMT modulation, the principles of the present invention may be applied, mutatis mutandis, to other data transmission systems and modulation schemes. For example, the present invention is applicable to DMT-based Very High Speed DSL (VDSL), as well as to other systems that transmit large data symbols. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmitting data, comprising:
arranging a predetermined quantity of the data together with one or more overhead bytes in an overhead frame;
dividing the overhead frame into a number Q of equal segments, each of the segments comprising a number of bits that is not an integer multiple of eight, wherein the one or more overhead bytes comprise a number of overhead bytes that is not an integer multiple of Q; and
encoding each of the segments as a symbol for transmission over a communication channel.

2. A method according to claim 1, wherein the number of overhead bytes is less than Q.

3. A method according to claim 1, wherein the overhead bytes comprise one or more framing bytes.

4. A method according to claim 1, wherein the overhead bytes comprise one or more error correction bytes.

5. A method according to claim 1, wherein encoding each of the segments as a symbol comprises generating discrete multi-tone (DMT) symbols.

6. A method according to claim 5, wherein generating the DMT symbols comprises generating the symbols for transmission over a digital subscriber line (DSL) connection.

7. A method for transmitting data, comprising:
arranging a predetermined quantity of the data together with one or more overhead bytes in an overhead frame;
dividing the overhead frame into equal segments, each of the segments comprising a number of bits that is not an integer multiple of eight; and
encoding each of the segments as a symbol for transmission over a communication channel,
wherein the overhead bytes comprise one or more framing bytes, and
wherein the one or more framing bytes comprise a number S of framing bytes in the overhead frame, and wherein dividing the frame into equal segments comprises dividing the frame into a number Q of segments, wherein S is not an integer multiple of Q.

8. A method according to claim 7, wherein S is less than Q.

9. A method for transmitting data, comprising:
arranging a predetermined quantity of the data together with one or more overhead bytes in an overhead frame;
dividing the overhead frame into equal segments, each of the segments comprising a number of bits that is not an integer multiple of eight; and
encoding each of the segments as a symbol for transmission over a communication channel,
wherein the overhead bytes comprise one or more error correction bytes, and
wherein the one or more error correction bytes comprise a number P of check bytes in the overhead frame, and wherein dividing the frame into equal segments comprises dividing the frame into a number Q of segments, wherein P is not an integer multiple of Q.

10. A method according to claim 9, wherein P is less than Q.

11. A method for transmitting data, comprising:
arranging a predetermined quantity of the data together with one or more overhead bytes in an overhead frame;
dividing the overhead frame into equal segments, each of the segments comprising a number of bits that is not an integer multiple of eight; and
encoding each of the segments as a symbol for transmission over a communication channel,
wherein the overhead bytes comprise one or more error correction bytes, and
wherein arranging the data in the overhead frame comprises generating a Reed-Solomon codeword, and wherein the error correction bytes comprise parity bytes of the Reed-Solomon codeword.

12. A method for transmitting data, comprising:
arranging a predetermined quantity of the data together with one or more overhead bytes in an overhead frame;
dividing the overhead frame into equal segments, each of the segments comprising a number of bits that is not an integer multiple of eight; and
encoding each of the segments as a symbol for transmission over a communication channel,
wherein dividing the overhead frame into segments comprises determining the number of bits to be comprised in each segment responsive to a characteristic of the communication channel.

13. A method for transmitting data, comprising:
arranging a predetermined quantity of the data together with one or more overhead bytes in an overhead frame;
dividing the overhead frame into equal segments, each of the segments comprising a number of bits that is not an integer multiple of eight; and
encoding each of the segments as a symbol for transmission over a communication channel,
wherein encoding each of the segments comprises generating symbols for transmission over a digital subscriber line (DSL) connection at a standard DSL symbol rate, and wherein arranging the data in the overhead frame comprises determining the quantity of the data and adding the overhead bytes thereto so that the data are transmitted over the communication channel at a transmission bit rate that is not a multiple of eight times the standard DSL symbol rate.

14. A method according to claim 13, wherein the standard DSL symbol rate comprises an Asymmetric DSL (ADSL) rate of 4000 symbols/sec.

15. A method according to claim 13, wherein generating the symbols comprises assembling the data in the symbols substantially without bit-stuffing.

16. A method according to claim 13, wherein encoding each of the segments comprises synthesizing a symbol clock at which to transmit the symbols over the DSL connection, based on a reference clock at the transmission rate provided at a central communication office.

17. A method for transmitting data, comprising:
arranging a predetermined quantity of the data together with a selected number of overhead bytes in an overhead frame;
dividing the overhead frame into a number of equal segments, such that the selected number of the overhead bytes is not an integer multiple of the number of segments, wherein the overhead bytes comprise a number S of framing bytes, wherein S is not an integer multiple of the number of the segments; and
encoding each of the segments as a symbol for transmission over a communication channel.

18. A method according to claim 17, wherein S is less than the number of the segments.

19. A method according to claim 17, wherein the overhead bytes comprise a number P of error correction bytes, wherein P is not an integer multiple of the number of the segments.

20. A method according to claim 19, wherein P is less than the number of the segments.

21. A method according to claim 19, wherein arranging the data in the overhead frame comprises generating a Reed-Solomon codeword, and wherein the error correction bytes comprise parity bytes of the Reed-Solomon codeword.

22. A method according to claim 17, wherein encoding each of the segments as a symbol comprises generating discrete multi-tone (DMT) symbols.

23. A method according to claim 22, wherein generating the DMT symbols comprises generating the symbols for transmission over a digital subscriber line (DSL) connection.

24. A method for transmitting data, comprising:
arranging a predetermined quantity of the data together with a selected number of overhead bytes in an overhead frame;
dividing the overhead frame into a number of equal segments, such that the selected number of the overhead bytes is not an integer multiple of the number of segments; and
encoding each of the segments as a symbol for transmission over a communication channel,
wherein the selected number of the overhead bytes is less than the number of the segments.

25. A data transmitter, comprising:
 a frame processor, adapted to arrange a predetermined quantity of the data together with one or more overhead bytes in an overhead frame; and
 an encoder, adapted to divide the overhead frame into a number Q equal segments, wherein the one or more overhead bytes comprise a number of overhead bytes that is not an integer multiple of Q, each of the segments comprising a number of bits that is not necessarily an integer multiple of eight, and to encode each of the segments as a symbol for transmission over a communication channel.

26. A transmitter according to claim 25, wherein the number of overhead bytes is less than Q.

27. A transmitter according to claim 25, wherein the frame processor comprises a framer, and wherein the overhead bytes comprise one or more framing bytes introduced by the framer.

28. A transmitter according to claim 25, wherein the frame processor comprises an error correction encoder, and wherein the overhead bytes comprise one or more error correction bytes generated by the encoder.

29. A transmitter according to claim 25, wherein the symbols comprise discrete multi-tone (DMT) symbols.

30. A transmitter according to claim 29, wherein the transmitter is adapted to transmit the DMT symbols over a digital subscriber line (DSL) connection.

31. A transmitter according to claim 25, wherein the number of bits to be comprised in each segment is determined responsive to a characteristic of the communication channel.

32. A data transmitter comprising:
 a frame processor, adapted to arrange a predetermined quantity of the data together with one or more overhead bytes in an overhead frame; and
 an encoder, adapted to divide the overhead frame into equal segments, each of the segments comprising a number of bits that is not necessarily an integer multiple of eight, and to encode each of the segments as a symbol for transmission over a communication channel,
 wherein the frame processor comprises a framer, and wherein the overhead bytes comprise one or more framing bytes introduced by the framer, and
 wherein the equal segments comprise a number Q of segments, and wherein the one or more framing bytes comprise a number S of framing bytes that is not an integer multiple of Q.

33. A transmitter according to claim 32, wherein S is less than Q.

34. A data transmitter comprising:
 a frame processor, adapted to arrange a predetermined quantity of the data together with one or more overhead bytes in an overhead frame; and
 an encoder, adapted to divide the overhead frame into equal segments, each of the segments comprising a number of bits that is not necessarily an integer multiple of eight, and to encode each of the segments as a symbol for transmission over a communication channel,
 wherein the frame processor comprises an error correction encoder, and wherein the overhead bytes comprise one or more error correction bytes generated by the encoder, and
 wherein the equal segments comprise a number Q of segments, and wherein the one or more error correction bytes comprise a number P of check bytes that is not an integer multiple of Q.

35. A transmitter according to claim 34, wherein P is less than Q.

36. A data transmitter comprising:
 a frame processor, adapted to arrange a predetermined quantity of the data together with one or more overhead bytes in an overhead frame; and
 an encoder, adapted to divide the overhead frame into equal segments, each of the segments comprising a number of bits that is not necessarily an integer multiple of eight, and to encode each of the segments as a symbol for transmission over a communication channel,
 wherein the frame processor comprises an error correction encoder, and wherein the overhead bytes comprise one or more error correction bytes generated by the encoder, and
 wherein the error correction encoder comprises a Reed-Solomon encoder, and wherein the error correction bytes comprise parity bytes of a Reed-Solomon codeword.

37. A data transmitter, which is coupled to transmit the symbols over a digital subscriber line (DSL) connection at a standard DSL symbol rate, the transmitter comprising:
 a frame processor, adapted to arrange a predetermined quantity of the data together with one or more overhead bytes in an overhead frame, and
 an encoder, adapted to divide the overhead frame into equal segments, each of the segments comprising a number of bits that is not necessarily an integer multiple of eight, and to encode each of the segments as a symbol for transmission over a communication channel,
 wherein the quantity of the data and of the overhead bytes added thereto is determined so that the data are transmitted over the communication channel at a transmission bit rate that is not a multiple of eight times the standard DSL symbol rate.

38. A transmitter according to claim 37, wherein the standard DSL symbol rate comprises an Asymmetric DSL (ADSL) rate of 4000 symbols/sec.

39. A transmitter according to claim 37, wherein the encoder is adapted to assemble the data in the symbols substantially without bit-stuffing.

40. A transmitter according to claim 39, wherein a symbol clock at which to transmit the symbols over the DSL connection is synthesized based on a reference clock at the transmission rate provided at a central communication office.

41. A data transmitter, comprising:
 a frame processor, adapted to arrange a predetermined quantity of the data together with a selected number of overhead bytes in an overhead frame; and
 an encoder, adapted to divide the overhead frame into a number of equal segments, such that the selected number of the overhead bytes is not an integer multiple of the number of segments, and to encode each of the segments as a symbol for transmission over a communication channel,
 wherein the overhead bytes comprise a number S of framing bytes, wherein S is not an integer multiple of the number of the segments.

42. A transmitter according to claim 41, wherein S is less than the number of the segments.

43. A transmitter according to claim 41, wherein the overhead bytes comprise a number P of error correction bytes, wherein P is not an integer multiple of the number of the segments.

44. A transmitter according to claim 43, wherein P is less than the number of the segments.

45. A transmitter according to claim 43, wherein the frame processor comprises a Reed-Solomon encoder, such that the overhead frame comprises a Reed-Solomon codeword, and wherein the error correction bytes comprise parity bytes of the Reed-Solomon codeword.

46. A transmitter according to claim 41, wherein the symbols comprise discrete multi-tone (DMT) symbols.

47. A data transmitter comprising:
- a frame processor, adapted to arrange a predetermined quantity of the data together with a selected number of overhead bytes in an overhead frame; and
- an encoder, adapted to divide the overhead frame into a number of equal segments, such that the selected number of the overhead bytes is not an integer multiple of the number of segments, and to encode each of the segments as a symbol for transmission over a communication channel, wherein the selected number of the overhead bytes is less than the number of the segments.

* * * * *